United States Patent [19]

Ford

[11] Patent Number: 5,085,000

[45] Date of Patent: Feb. 4, 1992

[54] DISPOSABLE BAIT BOX WITH PRE-MOISTENED BEDDING

[76] Inventor: James A. Ford, 217 Davis Ave., Nampa, Id. 83651

[21] Appl. No.: 494,477

[22] Filed: Mar. 16, 1990

[51] Int. Cl.$^5$ .............................................. A01K 97/04
[52] U.S. Cl. ........................................................ 43/55
[58] Field of Search .............................. 43/55, 54.1, 56; 206/315.11

[56] References Cited

U.S. PATENT DOCUMENTS

| | | | |
|---|---|---|---|
| 2,849,828 | 9/1958 | Johnson | 43/55 |
| 3,236,206 | 2/1966 | Willinger | 43/55 |
| 4,882,872 | 11/1989 | Todd | 43/55 |

OTHER PUBLICATIONS

Popular Mechanics, vol. 94, Issue 1, p. 172, July, 1950.

Primary Examiner—Kurt Rowan
Attorney, Agent, or Firm—Frank J. Dykas; Craig M. Korfanta; Ken J. Pedersen

[57] ABSTRACT

A disposable bait box with pre-moistened bedding formed of a single sheet bait box blank (20) having front wall panel (24), side panels (21), back panel (22) and four bottom panels (26), so as to form an escape proof container. Closure panel (38), seal panel (43) and closure lid (32) are provided to provide an escape proof upper cover. Bedding (11) is pre-moistened with non-chlorinated water and contained within plastic bag (12) from which it can be deposited into bait box (10) in order to prepare bait box (10) for immediate use with earthworms (13). Ventilation holes (23) are provided in side walls (21) and back panel (22). Bait box blank (20) is formed of biodegradable material and coated on the side which forms the interior surfaces with a biodegradable moisture barrier.

7 Claims, 4 Drawing Sheets

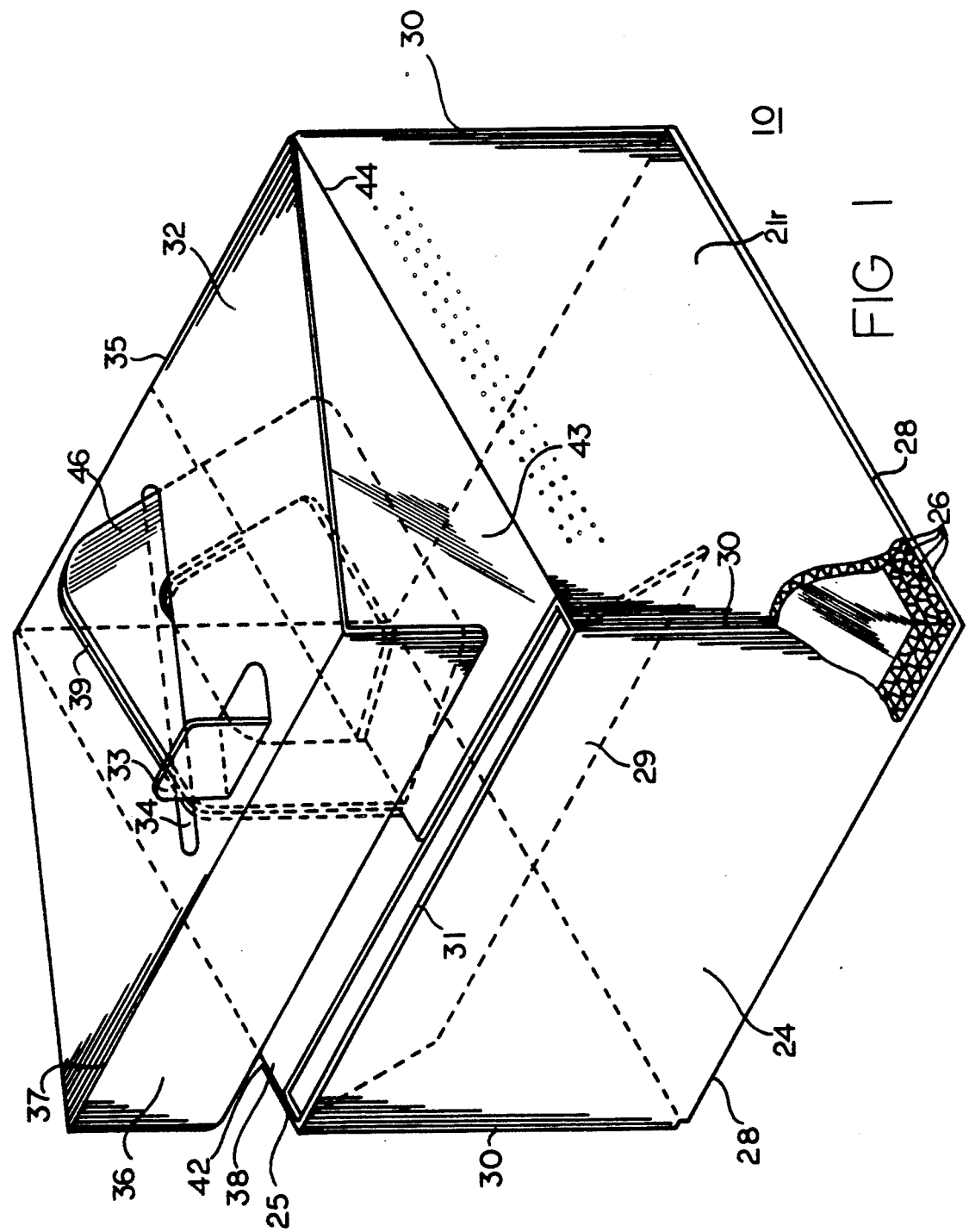

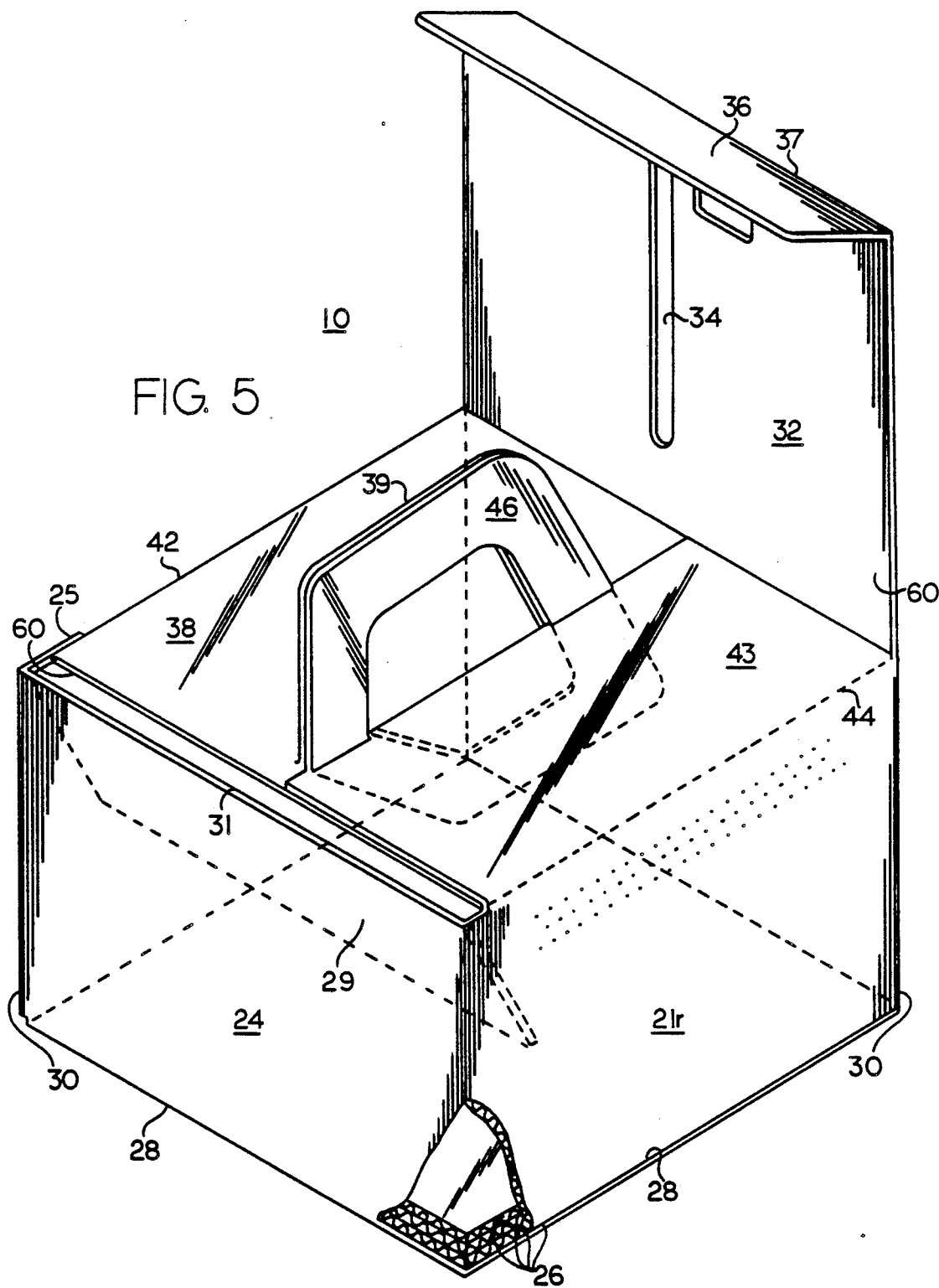

DISPOSABLE BAIT BOX WITH PRE-MOISTENED BEDDING

BACKGROUND OF THE INVENTION

1. Technical Field

This invention generally relates to a disposable bait box containing a pre-moistened worm bedding, and more particularly to a cardboard bait box formed from a single blank and having a four-layered bottom and three-layered top for holding a nutrient laden pre-moistened worm bedding.

2. Background Art

Almost since the development of the barbed fish hook, man has used the lowly earthworm as bait when fishing. The traditional way of obtaining an adequate supply of earthworms was to take a shovel and dig in the ground until an adequate supply was uncovered and captured. As in the case of other of man's endeavors, a commercial industry has developed in the United States to supply earthworms as bait for fishermen.

Today, most earthworms that are used as bait by sport fishermen are purchased at bait shops or roadside stands located in the vicinity where the fisherman intends to be fishing. These earthworms are raised commercially and earthworm farms ranging in size from the small cottage industry located in a garage behind a house all the way to large commercial facilities which produce earthworms by the ton. The typical commercial production facility utilizes containers of some sort to hold worm bedding, which provides a suitable environment for the growth and reproduction of earthworms. U.S. Pat. Nos. 4,646,682 and 4,815,416, both teach worm containers suitable for use in growing earthworms. Worms grown in these commercial facilities are then harvested by use of a device which separates the earthworms from the bedding, such as that disclosed in U.S. Pat. No. 4,187,946. The technology utilized in the commercial growth of earthworms is a bit more sophisticated than it would at first appear. The earthworm bedding must provide a suitable environment containing adequate levels of moisture, organic material and microbial growth upon which the earthworm feeds.

The real problem lies in the point of purchase packaging where the earthworms are sold to sport fishermen for use as bait. Typically the earthworms are contained in small containers and sold in lots of ten or twelve. These containers contain small amounts of bedding and are usually stored in a refrigerated case. Under current practice it is up to the sport fisherman to provide his own container for the bait once purchased.

The point of purchase container is usually not adequate for even intermediate term survival of the earthworms contained therein. The amount of bedding and its protection from the environment is so limited that the earthworms contained in it can and often die within an hour or two unless transferred into a more protected and suitable environment. This poses a problem for the sport fisherman intending a multi-day fishing trip since the supply of bait may not survive the entire trip. The typical solution is either that the sport fisherman purchases fresh bait each day or invests in a bait box such as that disclosed by U.S. Pat. No. 2,257,879.

In recent years attempts have been made to provide inexpensive, disposable bait boxes and bedding systems for use by sport fishermen. Almost invariably these containers are formed of plastic so as to be impervious to bedding moisture and contain, at their point of purchase location, a dried bedding, usually shredded paper, to which the sport fisherman adds water to form a suitable bedding.

The problems with these attempted solutions are three-fold. The first, the plastic containers are bulky and difficult to dispose of. If improperly dropped along the roadside or left behind at the fishing site, they create unsightly and permanent, non-degradable, litter.

The second, is that the worm bedding is not ready for immediate use merely upon the addition of water to it. In fact, most commercial dry bedding preparations offered for sale are accompanied by instructions that earthworms are not to be deposited into the bedding for at least twenty-four hours after it has been moistened. The reason is that domestic water supplies are used to moisten the bedding, and, in the summer time, most domestic water supplies are heavily chlorinated. Heavily chlorinated water is fatal to earthworms and as a result there is a requirement that the moistened bedding be allowed to stand unused in the air for at least twenty-four hours to allow the entrained chlorine to escape. In addition, some of these beddings do not contain the necessary nutrients, microbial growth and organic material necessary for sustained survival of earthworms, and as a result, even if properly moistened, will not keep the earthworms alive for more than a few days. And finally, certain beddings, particularly those made solely of shredded paper can heat up when water is added.

A third problem with plastic earthworm containers involves the fact that earthworms require a cool environment. Temperatures above 70° F. are generally lethal to earthworms. Thus, if a plastic bait box were to be left exposed to sunlight during the day, either on the fishing bank or in a vehicle, the temperature of the bedding will rapidly rise and the earthworms will be destroyed.

Accordingly, it is an object of this invention to provide an inexpensive, biodegradable, bait box. It is a second object of this invention to provide a bait box system which contains a pre-moistened, non-chlorinated bedding having the necessary nutrients, microbial population and organic material for intermediate earthworm storage. It is another object of this invention to provide a cardboard bait box which can be formed from a single sheet blank which is relatively impervious to moisture and escape proof as it relates to earthworms.

DISCLOSURE OF INVENTION

These objects are accomplished by use of a disposable bait box formed of cardboard material, in a generally rectangular shape. Attached at the bottom edges of the front, back and two opposing side walls are four bottom panels, each attached along the bottom of a respective side wall and extending inwardly to form a four-layered bottom with each side, sealed at the fold line by one bottom panel, to prevent leakage of bedding material, moisture and the escape of earthworms. A front lip is attached and extends along the top of the front wall, and extends angularly downward into the interior of the box to provide an escape barrier for earthworms over the front wall. A pair of overlapping closure panels are attached to the top and extend along the opposing side. And finally, a closure lid attached to the back wall and having a closure tab for insertion into the interior of the box adjacent to the front lip provides a triple walled top panel.

A plurality of ventilation holes are formed in the back and side walls to provide for ventilation to the bedding.

A pre-moistened bedding material containing non-chlorinated water and the necessary organic matter, nutrients and microbial population is provided in a moisture-proof plastic bag for use by the sport fisherman when preparing the bait box for storage of earthworms.

The box is sized to provide an adequate volume of space above the bedding for positioning of a heat sink such as a frozen bag of water to keep the interior of the box and bedding cool for an extended period of time.

BRIEF DESCRIPTION OF THE DRAWINGS

FIG. 1 is a perspective representational view of a partially opened bait box.

FIG. 5 is a perspective representational view of a partially closed bait box.

BEST MODE FOR CARRYING OUT INVENTION

Figure 3:
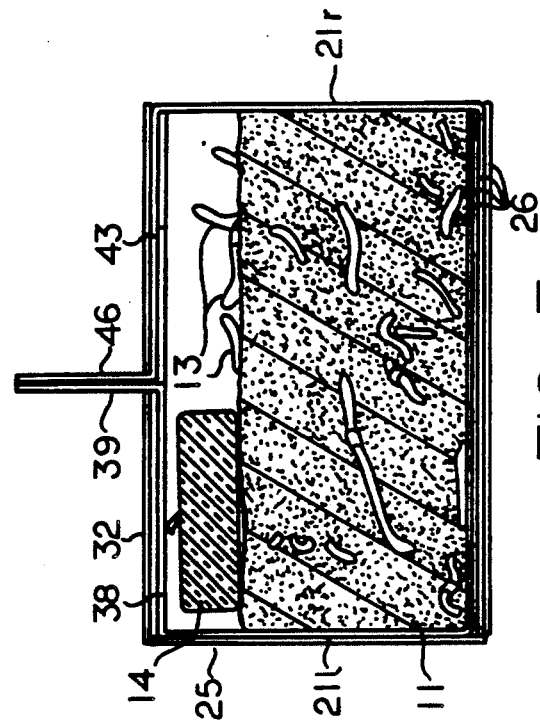
FIG. 3 is a sectional side view of the bait box with unpackaged earthworm bedding.
Figure 2:
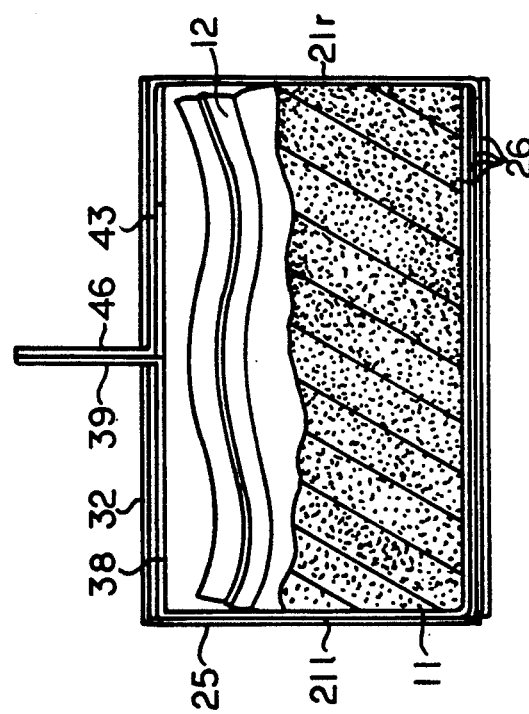
FIG. 2 is a sectional side view of the bait box with pre-packaged earthworm bedding.
Figure 4:
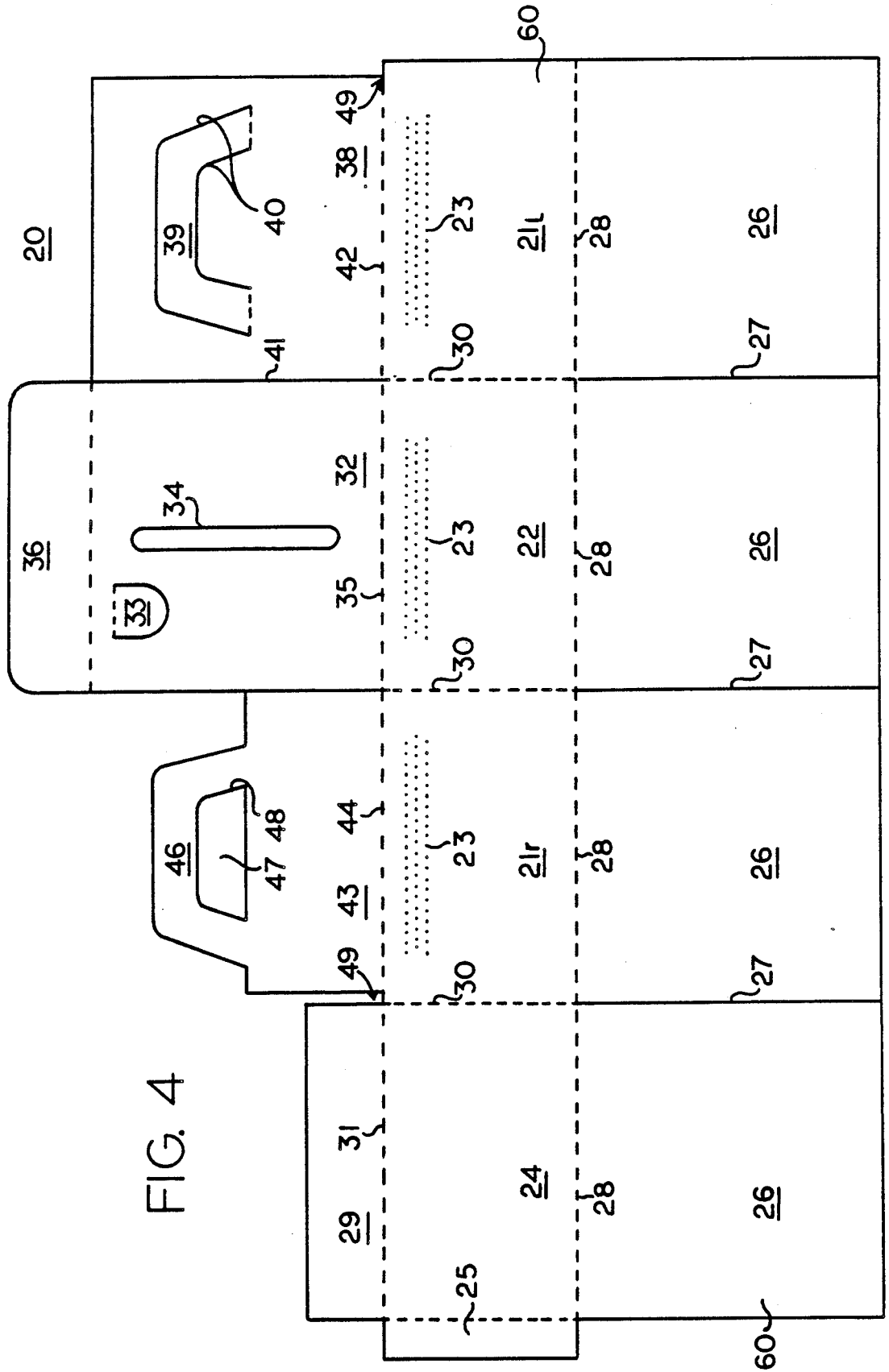
FIG. 4 is a top plan view of a pre-cut bait box blank.

Disposable bait box 10, as shown in FIGS. 2 and 3, is formed from unfolded cardboard bait box blank 20, as shown in FIG. 4, and bedding 11 contained within moisture proof bag 12.

As shown in FIGS. 1 and 4, unfolded bait box blank 20 is pre-cut and creased to form fold lines for a variety of panels. Bait box blank 20 is pre-formed to provide front wall panel 24, side wall panels 21l and 21r and back wall panel 22. Located at the bottom edge of these panels are fold lines 28 which separate the side panels from bottom panels 26, each of which are separated from each other along bottom panel cut lines 27. Attached to front panel 24, along its outer side edge at side wall fold line 30, is glue tab 25 which, when the box is formed as shown in FIG. 1, is used to attach front wall 24 to side wall 21l. Attached to and extending along the top edge of front panel 24 is front lip 29, which folds along front lip fold line 31 to form an interior barrier to prevent earthworms from escaping over the front wall of bait box 10.

When the front, back and side walls are folded along fold lines 30 to form a rectangular box, bottom panels 26 can then be folded up to form a four-layered bottom for bait box 10, with each edge of the bottom sealed by fold lines 28. Thus the result is a square shaped cardboard bait box with the side corners sealed along the fold lines 30 and glue tab 25, and the bottom edges and corners sealed along fold lines 28.

To seal the remainder of the box, closure panel 38, seal panel 43 and closure lid 32 are provided. When viewed from the front of the box when assembled, closure panel 38 is attached to side panel 21l along closure panel fold line 42. Closure panel 38 is sized to cover the entire width of the top opening of bait box 10, with the exception of closure panel offset notch 49 which is sized to allow closure panel 38 to close along the increased thickness of front panel 24 created by the folded, inwardly extending, front lip 29. Formed integral with closure panel 38 is closure panel handle 39 which is formed by means of kiss cuts 40 so as to enable the assembler of bait box 10 to push out and extend up closure panel handle 39.

When the assembler pushes out and extends up closure panel handle 39, there naturally remains behind, a conformingly shaped hole in closure panel 38. To cover this hole, seal panel 43 is provided. It is attached to and extends along the top edge of side panel 21r along seal panel fold line 44. Extending out from the opposite side of seal panel 43 is seal panel handle 46, which conforms in size and shape to closure panel handle 39 and is designed to be folded along seal panel handle fold lines 50. Seal panel 43 is sized such that when seal panel handle 46 is folded upward, the outer edge of seal panel 43 and seal panel handle 46 will abut against the upwardly folded closure panel handle 39, thus covering the handle hole left in closure panel 38 when the handle is folded up. Since neither closure panel 38 and seal panel 43 interlock together or otherwise interlock with the rest of bait box 10, as shown in FIG. 5, closure lid 32 is provided. It is attached along closure lid fold line 35 to back wall 22 and is intended to fold over the top of closure panel 38 and seal panel 43 to seal the top of bait box 10. Attached to closure lid 32 is closure tab 36 which folds down along closure tab fold line 37 and is sized to be inserted, as shown in FIG. 1, into the interior of bait box 10 adjacent to front lip 29. Handle receiving slot 34 is formed integral with closure lid 32 for the insertion therethrough of closure panel handle 38 and seal panel handle 46.

In practice it has been found that it is relatively difficult to reopen bait box 10 after it has been tightly shut. Accordingly, pull tab 33 is provided to extend up from the top of closure lid 32 to provide a convenient handle with which to open bait box 10.

As previously stated in other sections of this specification, one of the main objects of the present invention is to provide a convenient bait box system intended for sale to sport fishermen at the point of purchase for bait. Accordingly, as shown in FIG. 3, the entire system further includes, in addition to assembled bait box 10, a sealed container of worm bedding 11 contained in moisture proof plastic bag 12. Bedding 11 is pre-moistened with non-chlorinated water, and is intended for immediate use upon purchase of the bait box. The sport fisherman merely has to unseal moisture proof bag 12 and deposit the bedding into bait box 10 in order to prepare the bait box for immediate use for earthworms 13.

The box can also be used without the bedding to hold other baits such as crawdads and sand shrimps.

Ventilation holes 23, as shown in FIG. 4, are provided in side panels 21r and 21l as well as back panel 22 to provide adequate ventilation when bait box 10 is assembled.

Also, it is important that the bait box 10 and bedding 11 be kept cool, preferably below 70° F. in order to provide an optimal environment for earthworms 13. Accordingly, as is shown in FIG. 3, heat sink 14 is also provided. While this can embody a sophisticated chemical type product, it has been found in practice that a water proof, sealable, plastic bag, into which water has been placed and frozen, usually provides an adequate heat sink for keeping bedding 11 cool.

Since the bedding, when in use, is moist, there is a need to provide some sort of moisture barrier to prevent premature decomposition of the bait box. This is easily accomplished by applying film 60 of a moisture impervious, biodegradable material, to the side of bait box blank 20 which, when assembled, forms the interior surfaces of the bait box. Additionally, as previously stated in the objects of this invention, proper disposal of the bait box, after use, is a desirable feature. For this reason, bait box blank 20 is formed of cardboard, which is biodegradable, and treated with chemicals to provide a water impervious barrier. Vapor impervious, biodegradable, chemicals are well known in the container art and technologies, and the exact formulation of such plays no part in the present invention other than the fact of its application to the interior surface side of bait box blank 20 and its use with a disposable bait box.

While there is shown and described the present preferred embodiment of the invention, it is to be distinctly understood that this invention is not limited thereto but may be variously embodied to practice within the scope of the following claims.

Accordingly, what I claim is:

1. A disposable bait box comprising:
   a rectangular cardboard box having first and second opposing side walls and an attached back wall and an attached front wall;
   four bottom panels each attached along a bottom edge of the back wall, front wall and first and second side walls and extending inwardly to form a four-layered box bottom;
   a front lip attached to and extending along the top edge of the front wall and extending downwardly into the interior of said box;
   a closure panel attached to the top edge and extending along the first side wall, said closure panel sized to cover the top of the box formed of the front and back walls, first and second side walls and the bottom panels;
   a closure panel handle attached to and extending normally up from said closure panel;
   a seal panel attached to the top edge and extending along the second side wall for positioning adjacent to and atop the closure panel;
   a seal panel handle attached to and extending normally up from the seal panel in a position adjacent to the closure panel handle when the seal panel is positioned atop the closure panel;
   a closure lid attached to the top edge and extending along the back wall for positioning atop the closure and seal panels, said closure lid having a slot formed therein for insertion therethrough of the closure and seal panel handles;
   a closure tab attached to and extending along the edge of the closure lid opposite that which is attached to the back wall, said closure tab formed for insertion into the interior of the box adjacent to the front lip; and
   a pull tab attached to and extending up from the closure lid.

2. The bait box system of claim 1 wherein said bait box further comprises earthworm bedding material pre-moistened with non-chlorinated water.

3. The bait box system of claim 1 wherein said bait box is formed of a single sheet of cardboard.

4. The bait box system of claim 3 wherein said single sheet of cardboard is coated on one surface with a water impervious, biodegradable material.

5. The bait box system of claim 1 wherein said side walls have formed therein a plurality of ventilation holes.

6. The bait box system of claim 1 which further comprises a heat sink sized for insertion and positioning above the bedding inside of the bait box.

7. A disposable bait box system which comprises:
   a biodegradable container for containing earthworm bedding formed of a single sheet of cardboard which is coated on one surface with a water impervious, biodegradable material, said container further configured to have sidewalls; and
   pre-moistened worm bedding containing non-chlorinated water held in said container.

* * * * *